United States Patent [19]

Turner et al.

[11] Patent Number: 5,413,210
[45] Date of Patent: May 9, 1995

[54] CONTROLLING A FEED OF OBJECTS

[75] Inventors: William J. Turner, Middlesex; David A. Homer, Berks, both of Great Britain

[73] Assignee: Gersan Establishment, Vaduz, Liechtenstein

[21] Appl. No.: 971,815

[22] PCT Filed: Aug. 15, 1991

[86] PCT No.: PCT/GB91/01388
§ 371 Date: May 7, 1993
§ 102(e) Date: May 7, 1993

[87] PCT Pub. No.: WO92/03362
PCT Pub. Date: Mar. 5, 1992

[30] Foreign Application Priority Data

Aug. 15, 1990 [GB] United Kingdom ............... 9017889

[51] Int. Cl.⁶ ............................................. B65G 31/04
[52] U.S. Cl. ............................. 198/642; 198/803.16
[58] Field of Search ........................... 198/638–642, 198/803.16

[56] References Cited

U.S. PATENT DOCUMENTS

| | | | |
|---|---|---|---|
| 2,941,651 | 6/1960 | Hutter et al. | 198/803.16 X |
| 3,556,605 | 1/1971 | Berg, Sr. et al. | 198/638 X |
| 3,735,859 | 5/1973 | Miller | 198/220 |
| 3,871,512 | 3/1975 | Davidson et al. | 198/128 |
| 3,900,107 | 8/1975 | Hoppmann | 209/73 |
| 3,920,116 | 11/1975 | Butler | 198/642 |
| 3,934,704 | 1/1976 | Pisoni | 198/25 |
| 4,007,854 | 2/1977 | Ervine | 221/167 |
| 4,271,379 | 6/1981 | Eckelmeyer | 317/77 |
| 4,495,584 | 1/1985 | Yoshida | 364/479 |
| 4,498,234 | 2/1985 | Greslin et al. | 29/785 |
| 4,705,156 | 11/1987 | Boling | 198/392 |
| 4,828,100 | 5/1989 | Hoppmann et al. | 198/392 |
| 4,940,568 | 7/1990 | Hoyler et al. | 198/642 X |

FOREIGN PATENT DOCUMENTS

| | | |
|---|---|---|
| 278761A1 | 8/1988 | European Pat. Off. . |
| 1503606 | 12/1967 | France . |
| 3444833A1 | 6/1986 | Germany . |
| 3444833 | 6/1986 | Germany . |
| 2264/58 | 6/1958 | South Africa . |
| 2264/68 | 6/1958 | South Africa . |
| 1035641 | 7/1966 | United Kingdom . |
| 1054218 | 1/1967 | United Kingdom . |
| 1134059 | 11/1968 | United Kingdom . |
| 1179447 | 1/1970 | United Kingdom . |
| 2089072 | 6/1982 | United Kingdom . |
| 2167029 | 5/1986 | United Kingdom . |
| 2201648 | 9/1988 | United Kingdom . |

*Primary Examiner*—D. Glenn Dayoan
*Attorney, Agent, or Firm*—Rosen, Dainow & Jacobs

[57] ABSTRACT

An apparatus and method to control the velocity and spacing of a spaced feed of objects, includes a member rotatable about an axis and having at least one receptacle, the objects being fed into the apparatus in spaced succession so that they are captured in the receptacle and so that they acquire the circular motion of the member. The receptacle has means for releasing the objects so that they are projected with a predetermined velocity and with a predetermined frequency. The phase relationship of a rotatable feeder and the rotatable member is controlled by generating a signal representative of the phase difference of the rotatable members, filtering the signal for maintaining loop stability and controlling the drive means of the rotatable member using the signal.

44 Claims, 6 Drawing Sheets

CONTROLLING A FEED OF OBJECTS

BACKGROUND OF THE INVENTION

This invention relates to apparatus for projecting in free flight a succession of discrete objects with a closely controlled trajectory and frequency; in particular it relates to a device for accepting a spaced feed of discrete objects, for example nuts and bolts, and projecting them with a predetermined velocity and a predetermined frequency.

Apparatus has been disclosed (e.g. GB 2 201 648) for feeding objects accurately and with controlled frequency, but though it can be highly effective this apparatus requires a large number of components and can therefore be expensive.

Less accurate apparatus for feeding a succession of objects is disclosed in GB 2167029, in which the feeder has a circulating conveyor belt engaging a roll in such a way that the part of the belt immediately downstream of the roll extends in the direction of rotation. The roll has a circumferential channel into which successive objects are fed ensuring that the objects are travelling at and are released with a speed close to the circumferential speed of the roll and the belt.

This apparatus has the disadvantage that in order to operate smoothly, the belt and the base of the channel need to be of highly compressible material, which is found to release the objects with some perturbation.

It is desirable to provide apparatus that can project objects in spaced succession with an accurately controlled trajectory and frequency that does not need a large number of components.

THE INVENTION

The invention provides a method of and apparatus for projecting in free flight a feed of objects along a controlled trajectory. Preferred and/or optional features of the invention are set out in are also disclosed herein.

The object retaining means is preferably a receptacle, the object being retained in the receptacle by centrifugal force.

In order that the objects should have a precisely defined motion, it is desirable that they should come to rest in the receptacle. If they are bouncing around when released, their motion when released will not be precisely determined. Sufficient time for the objects to stop bouncing should be allowed between feeding the objects into the aperture and releasing the objects.

The apparatus of the invention can be highly accurate and may not require a large number of components, and so it can be inexpensive to manufacture.

The invention also accelerates a feed of objects. The invention may provide a rotatable member formed with at least one aperture at a first radius $r_1$, the objects being fed into the aperture and delivered along a channel to a receptacle at a second radius $r_2$, where $r_1$ is less than $r_2$.

The ratio $r_1:r_2$ may be between about 1:1 and about 1:6, preferably between 1:2 and 1:4.

It is preferred that, in order to have a high rate of feed of objects without having a large number of receptacles (which are expensive to make), the feeder may have a small number of receptacles (between 1 and 10 for example, preferably 4) and a high rate of rotation (between 2 and 10 revolutions per second for example). Preferably the rate of rotation is 3.75 revolutions per second, which with 4 arms gives a feed rate of 15 objects per second.

In use, the rotatable member would be rotatably mounted on a mounting member, but it need not be so supplied.

The receptacle may be formed so that at least one face is closed by a movable first face or release member, this face being opened at a fixed point in the motion of the rotatable member, so that the object is released. This movable first face may be connected to or integrally formed with a cam piece, which interacts with a stationary cam surface located on the mounting member, at the fixed point in the motion of the rotatable member to open the receptacle. Preferably said first face forms one face of the receptacle, at least one other face being formed by a movable closure member or side flap which is so linked to said first face that at the fixed point in the motion of the rotatable member the closure member opens simultaneously with the said first face. The moving members preferably move away from the object at an acceleration greater than the resultant of gravity and centrifugal acceleration.

The invention will be further described by way of example only with reference to the accompanying drawings.

PREFERRED EMBODIMENT

Figure 1:
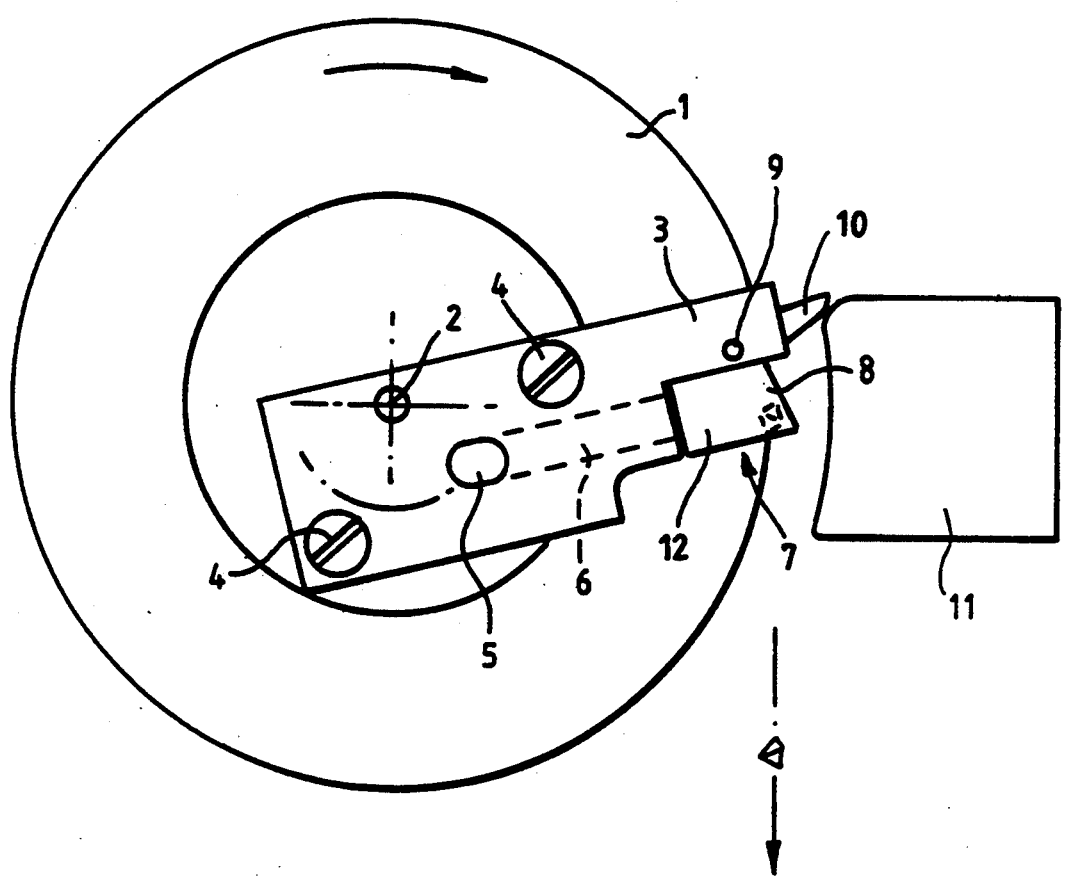
FIG. 1 shows a side view of an apparatus for projecting objects according to the invention.

Referring to FIG. 1, the rotatable member 1 of an apparatus for controlling the trajectory of a feed of discrete objects or launch control mechanism is shown. The rotatable member 1 is in the form of a pulley, and is rotatably mounted on a mounting member 1A and rotated about the pulley centre by drive means through a belt drive reduction system (not shown). A rotatable member 1 having one arm 3 is shown, though apparatus according to the invention may have any suitable number of arms.

The arm 3 is fixed to the rotatable member 1 by bolts 4 such that the axis of the arm 3 is inclined to the radius. The arm 3 is in the form of a machined metal arm of substantially rectangular section and substantially rectangular plan, but having slots cut into the radially outward end, giving that end a stepped plan.

The arm 3 has an object capture zone or aperture 5 of sufficiently large size to accept an object (the objects to be fed may be of non-uniform shape and size, e.g. gemstones such as diamonds). The aperture 5 communicates with a channel 6 of circular cross section formed in the body of the arm 3 and of sufficiently large bore to allow passage of the objects. The axis of the channel is inclined at an angle to the radial direction. The end of the channel 6 farthest from the aperture 5 is located radially outward of the aperture 5 so that when the member 1 is rotating, objects fed into the aperture 5 will be delivered down the channel 6 by centrifugal effect. The objects will at the same time be rotationally accelerated.

The objects are delivered into object retaining means in the form of a receptacle 7 located at the further end of the channel 6. The receptacle 7 is located in one of the steps of the radially outward end of the arm 3.

The radially outermost side of the receptacle 7 is formed by a movable first face or release member 8 pivotable about a pivot 9 in the arm 3. A cam piece 10 is integrally formed with the release member 8 extending at right angles thereto. The cam piece 10 protrudes radially outwards at the end of the arm 3. In order to release the object, the release member 8 is opened by the action of the cam piece 10 on a stationary cam 11 lying at a fixed point in the path of the cam piece 10.

The receptacle 7 is substantially in the form of a triangular prism, the release member 8 defining one triangular face. Two other faces of the receptacle are defined by movable closure members in the form of side flaps 12 on the direction-of-motion side of the receptacle 7. The release member 8 and the side flaps 12 are linked so that they open and close conjointly. Biasing means is provided to bias the release member and side flaps into a closed position.

The radially outermost part of the receptacle 7 is a corner of the receptacle 7 defined entirely by moveable parts i.e. release member 8 and side flaps 12. The object will come to rest in this corner and when these movable parts are moved by the action of the cam piece 10, they mus. accelerate away from the object so that it is smoothly released, that is, the faces must accelerate away from the closed position at an acceleration greater than the local resultant of gravity and centrifugal acceleration. Furthermore, the object must be released from such a position that it is not subsequently stricken by the cam piece 10.

Figure 2:
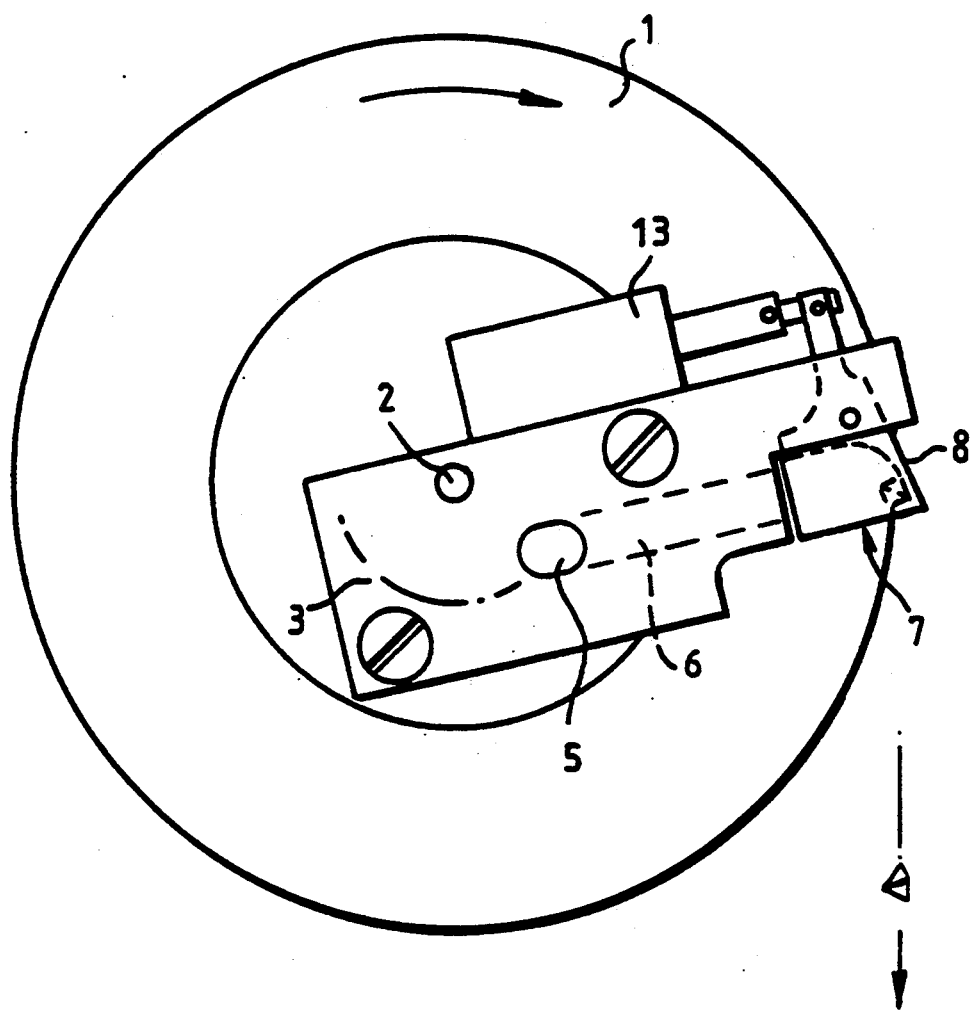
FIG. 2 shows an alternative embodiment of the apparatus having solenoid operation.

It is possible that the release member may be operated by a solenoid 13 as shown in FIG. 2, or other means located on the rotatable member 1, rather than by the cam and cam surface. The embodiment of FIG. 2 has the advantage that actuation of the solenoid opening the release member can be controlled by circuitry so that the release of the object can be programmed to occur at different positions.

At a fixed point in the motion of the rotatable member 1, the cam piece 10 contacts the cam surface of the stationary cam, and the release member 8 and the side flaps 12 open simultaneously so that the object is smoothly released from the receptacle and is launched with the instantaneous tangential velocity of the circular motion.

In the apparatus shown, the cam surface on the stationary cam 11 is positioned so that the object is released in a vertically downward direction, which has the advantage that the object will only subsequently accelerate in its direction of motion.

Figure 3:
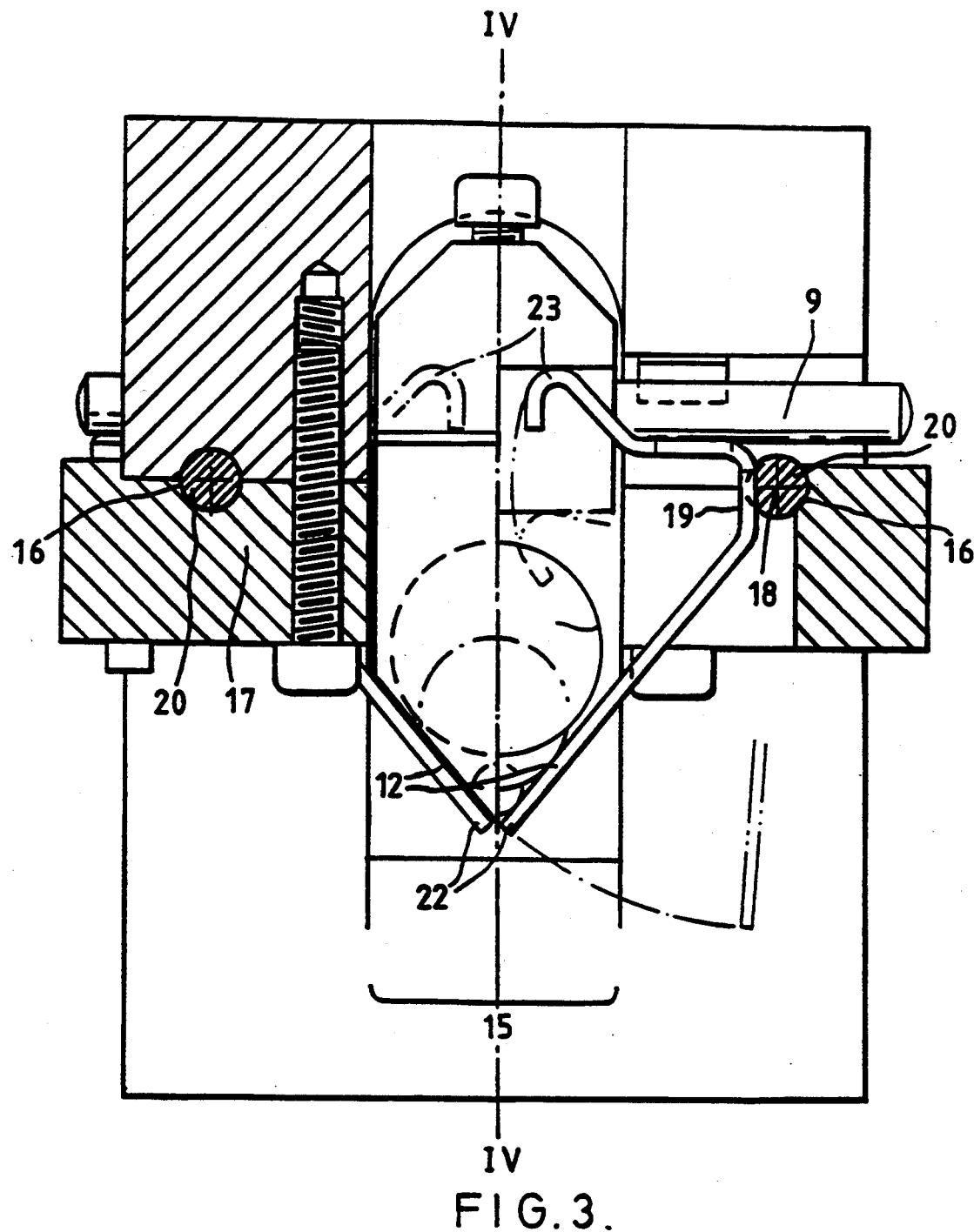
FIG. 3 is a detail end view of the receptacle.
Figure 4:
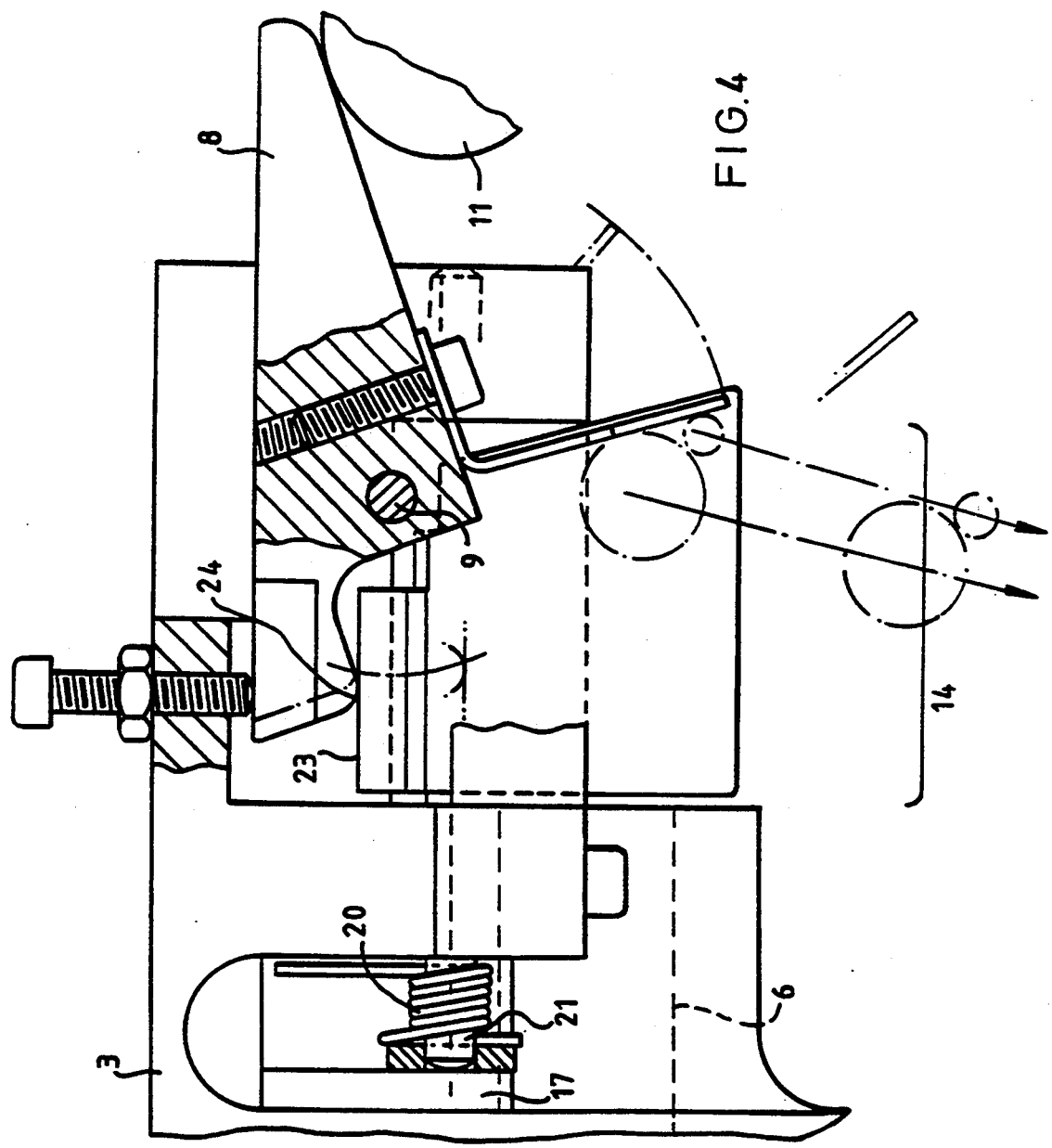
FIG. 4 shows a detail view of the receptacle along line IV—IV of FIG. 3.

The radially outer end of the arm 3 and the receptacle 7 will now be described in detail (FIGS. 3 and 4).

The shape of the end of the arm 3 is generally defined by a pair of slots 14 and 15 cut into it, one slot 14 being normal to the plane of rotation of the rotatable member 1 and the other slot 15 lying in the plane of rotation Of the rotatable member 1, being normal to the axis of the channel 6 and intersecting the first slot 14. In the zone where these two slots 14 and 15 intersect, the receptacle 7 is defined by the moving side flaps 12 and the release member 8. The release member 8 is pivoted to move in the second slot 15 and the side flaps 12 are pivoted to move in the first slot 14. The rest of the shape of the end of the end of the arm 3 is defined by an extension to continue channel 6 into the receptacle 7 and by projections having bearing for the pivots 16 of the side flaps 12 and the cam 10. Pivots 9 and 16 are preferably mounted in standard precision radial ball bearings. Angular contact bearings or V-block bearings could also be used.

The side flaps 12 are a mirror pair, of sheet metal construction, both of which are bent into approximately v-shaped straight sided troughs, each pivoting about an axis 17, 18 lying along the apex 19 of the respective trough. Coil springs 20 wrapped around pivot pins 21 of the side flaps 12 bias the side flaps 12 into a position with their respective edges 22 nearly touching, but not actually in contact with each other. If the edges are touching, there is a risk that the object will not be released smoothly. The other edges of the troughs do not touch and are curved over to define cam surfaces 23 on the side flaps 12. The two nearly touching faces of the flaps 12 form two of the parallel sides of the substantially triangular prismatic shaped receptacle 7. The third parallel side of the prism is partially defined by the faces having the cam surfaces 23.

The release member 8 defines an end of the receptacle 7. This is constructed so that the radially outermost end, where an object will come to rest, is defined entirely by the side flaps 12 and the release member 8, i.e. by moving parts. The release member 8 is fixed to a pivoting cam piece 10 having a first cam surface on its radially outermost surface and a secondary cam 24 on the other side of the pivot 9. This secondary cam 24 is in contact with the cam surfaces 23 of the side flaps 12. The springs 20 biassing the flaps together also bias the cam piece 10 due to its contact with the cam surfaces 23 and 24 into a position with the first cam surface projecting from the end of the arm 3, and with the secondary cam resting against stop. In this position, the release member 8 will close the end of the receptacle exactly.

The receptacle 7 is opened when the cam piece 10 engages the cam surface 11 of the stationary cam; the release member 8 then moves away from the side flaps 12, which are simulateneously moved away from each other by the action of the secondary cam 24 on the cam surfaces 23 of the side flaps 12.

The configuration of the cam piece 10 and the cam surface 11 should be such that the release member and the side flaps accelerate away from the object with an acceleration greater than the resultant of gravity and the centrifugal acceleration due to the rotary motion of the rotatable member 1, in order that the object is released smoothly. The secondary cam piece 24 of the cam 10 and the cam surfaces 23 of the side flaps 12 should be so configured that the release member 8 and the side flaps 12 all open simultaneously so that the object is released without any disturbing forces affecting its trajectory.

Figure 5:
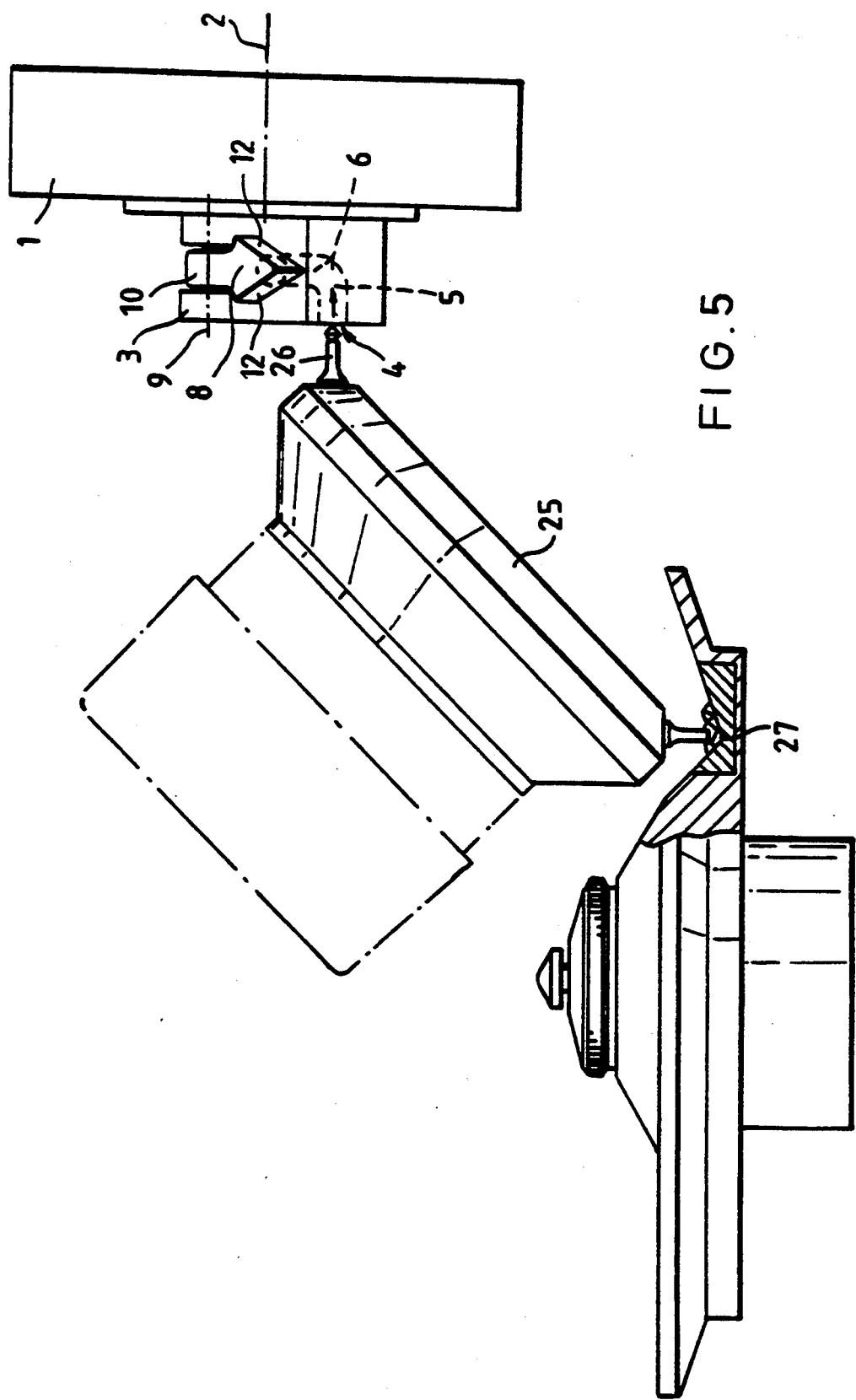
FIG. 5 is a further side view of the rotating member and arm coupled to a device for feeding objects in spaced succession into the apparatus.

In operation suitable feeder means are provided, for example as disclosed in GB-A-2171682. As shown in FIG. 5, the feeder means of GB-A-2171682 has a rotating nozzle wheel 25. This nozzle wheel 25 comprises a rotating member having suction nozzles 26 located around its rim, the nozzle wheel 25 being configured to rotate and pick up objects on the nozzle by suction from a rotating tray 27 and to deliver them into the aperture 5 of the rotatable member 1 by an annular blast of compressed air. This device is not an accurate feeder of objects, but as the aperture 5 may be quite large and (being at low radial distance from the pulley centre not moving very fast, the objects will be sufficiently accurately fed to be captured by the aperture. For good delivery of objects from a nozzle 26 to the aperture 5, the nozzle wheel 25 and the rotatable member 1 should be configured so that a nozzle carrying an object is brought very close to the aperture 5, and the rotation of the nozzle wheel 25 and the rotatable member 1 should be synchronised so that aperture and nozzle arrive at the delivery position at the same time. In the preferred embodiment, the delivery position is at bottom dead centre of the rotation of the rotatable member 1. In practice, the initiation of the blast of compressed air is slightly before this point, so that the object has time to accelerate away from the nozzle 26. The delivery position should be such that the object has time to travel down the channel 6 to a receptacle 7 and to come to rest in the receptacle 7 before being released. The 270° from bottom dead centre to the release position of the preferred embodiment is quite sufficient for the objects i.e. diamonds, used in the preferred embodiment.

When in the channel 6, the object experiences a centrifugal force and hence is accelerated down the channel. This radial motion will also give rise to a coriolis force, tending to increase the frictional resistance to the object travelling down the channel, as the object is pressed against the wall of the channel by the coriolis force. Having a channel inclined to the radius reduces the coriolis force, and hence the frictional resistance.

The rotational speed and position of the aperture 5 should be arranged such that the centrifugal acceleration over all positions of the channel is greater than the acceleration due to gravity.

The object travels down the channel 6 to the receptacle 7, which is closed. The object is retained in the receptacle 7 for a sufficient time for it to come to rest i.e. to stop bouncing before being released, and to acquire the rotary motion of the rotatable member 1. It can then be released and the direction of its release will be determined by the position of release in the rotatory motion of the rotatable member 1.

Thus the object is projected with a predetermined trajectory, i.e. closely controlled direction of travel, and closely controlled speed and release point. The speed of release is determined by the speed of rotation of the rotatable member 1, and the direction of release by the positioning of the cam surface 11, a downward release being preferred. The frequency of delivery of objects is defined both by the rate of rotation of the rotatable member 1 and by the number of arms 3 fixed to the rotatable member 1. In general if f is the rate of rotation of the rotatable member 1 and N is the number of arms 3 on the rotatable member 1, then a delivery rate of objects of f×N can be achieved. Owing to the cost and complexity of construction of the receptacles, it can be seen that this device offers advantages of economy in that it can achieve a high rate of feed without having a large number of arms and receptacles, by using instead a high frequency of rotation.

Figure 6:
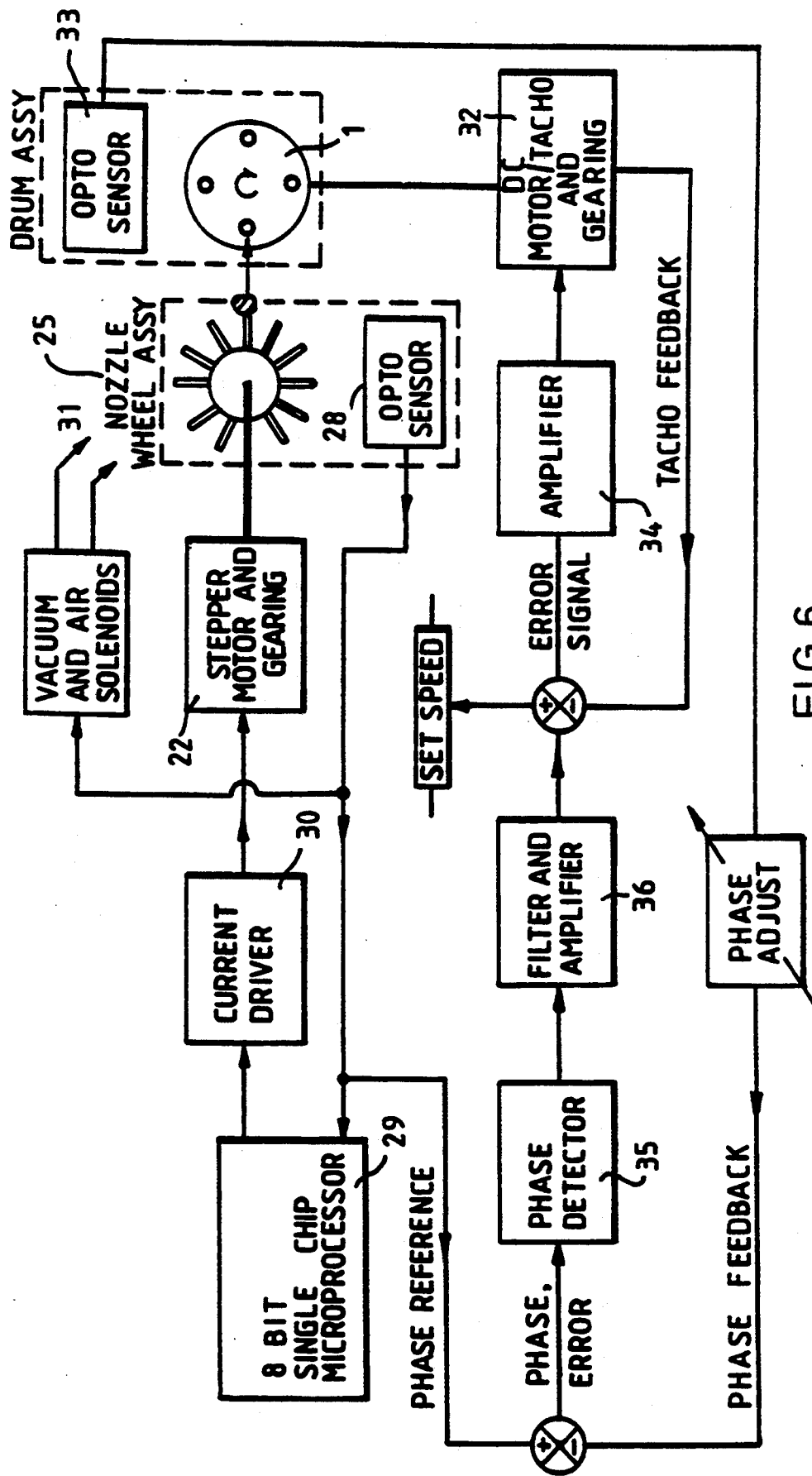
FIG. 6 is a block diagram of the electronic system for controlling the apparatus.

As the entire assembly of nozzle wheel 25 and rotatable member 1 comprises two independent rotating members, it will be necessary to ensure that the arrival of suction nozzles 26 and apertures 5 are synchronised. This may be done mechanically or electronically. In the preferred embodiment, electronic synchronising means are provided as shown in FIG. 6.

The nozzle wheel 25 has a stepper motor 27 which rotates the nozzle wheel 25 by a toothed pulley arrangement. An internal slotted optical switch or optosensor 28 detects the rotation of the nozzle wheel and gives an output signal as each nozzle 26 approaches the eject position. A single chip eight bit microprocessor 29 co-ordinates the drive to the nozzle wheel 25. The chip consists of an eight bit processor together with a timer, read only program memory, random access memory and twenty four ports for general purpose input or output signals. A DC motor and tachogenerator may be used instead of the stepper motor 27 to drive the nozzle wheel 25.

The stepper motor 27 is controlled by a current driver 30 which is interfaced to the chip using five output signals. Four of these signals control the phase at which the stepper motor is driven whilst the fifth selects either low or high voltage drive. Utilising sequential switching of these signals, the stepper motor 27 may be accelerated up to a steady rotational speed. The signal from the slotted optical switch 28 is used to confirm rotation of the nozzle wheel 25. Furthermore, it can detect a stall condition, when it removes the rotational drive and indicates an error by a suitable signal. The signal from the optical switch 28 is also used to synchronise the energisation of the eject air pulse at the correct orientation of the wheel by operating an air solenoid 31.

A host computer would normally control all main functions for controlling the stepper motor using commands such as START, STOP, FEED (apply vacuum to enable stones to be picked up and fed) and NOFEED (disable vacuum and thus feed no stones). The host computer would also be informed of other conditions such as LOW AIR AND VACUUM PRESSURE (sensed by pressure switches) and STALL.

The rotatable member 1 is driven by a D.C. permanent magnet motor 32 and tachogenerator via a pulley arrangement. A slotted optical sensor or optosensor 33 detects the rotation of the rotatable member giving an output signal as each aperture 5 approaches a reference orientation. Furthermore, the D.C. motor and tachogenerator 32 provides a voltage signal corresponding to the speed of the rotatable member 1.

In order to achieve satisfactory mechanical alignment of the nozzle and rotatable member 1 it is essential that the rotational phase relationship of the two assemblies is well maintained. This is achieved by a phase lock loop servo amplifier custom designed for controlling the speed and position of the D.C. motor 32. Tachogenerator feedback is compared with a reference voltage which sets the approximate speed of the rotatable member 1. Any error is an amplified by amplifier 34 and the current to the motor 32 is adjusted accordingly. The motor or speed is thus regulated to maintain approximate synchronicity to the rotation of the nozzle wheel assembly 25.

A phase detector 35 is used to detect the phase difference between pulses from the nozzle wheel 25 and the rotatable member 1. The drive for the rotatable member 1 is effectively electrically overdamped to maintain loop stability— any phase error is applied to adjust the speed of the rotatable member 1 so that the phase error is gradually forced to zero. To achieve this the phase error is suitably filtered at 36 so that extreme changes (which could lead to over correction of the phase error) are not applied. Instead, the filter 36 is designed so that the phase error is brought steadily to zero. Eventually, the nozzle wheel 25 and the rotatable member 1 will become synchronised. To facilitate ease of adjustment of the phase relationship between the rotatable member 1 and the nozzle wheel 25, a small phase adjustment may be made by delaying the rotating member feedback signal from the optical sensor 33.

EXAMPLE

An apparatus as set out in the description above but having four arms is used to project diamonds, which are of non-uniform shape and non-uniform size, in a downward direction. In the example, the rotatable member 1 is rotated at 3.75 revolutions per second to give a feed of 15 objects per second and the stationary cam 11 is configured so that the objects are released in a downward direction. The aperture is located at 16.76 mm along a radius from the centre of rotation of the rotatable member 1. This radial distance is chosen to give the same linear speed for the aperture as for the nozzles of the nozzle wheel. At this radius and rate of rotation, the instantaneous centrifugal acceleration at the aperture is approximately 1 g or about 10 ms$^{-2}$. The axis of the channel 6 is at an angle of 46.2° to the radius. The stationary cam 11 is located at a radial distance of 72.5 mm from the centre of rotation of the rotatable member.

The receptacle is so constructed that a diamond of radius 4 mm comes to rest in the aperture at a radius of 63.6 mm, being subsequently released with a tangential velocity of 1.498 meters per second. An object of radius 11mm comes to rest at a position 60.7mm from the centre of rotation and is released with a tangential velocity of 1.43 meters per second.

These sizes represent extremes of the size range to be used— diamonds are preferably size graded into broad classes before being introduced into the machine— and it is found that there is a small angular error (of about 1.5°) in the release direction due to the fact that diamonds of different size come to rest in different positions in the receptacle before being released. It is found that the trajectories of the diamonds converge, (see chain dotted lines in FIG. 4) and it is possible to design the receptacle such that the loci of diamonds of all sizes projected by the device pass through one point. As the device is intended to project objects in free flight through a machine for measuring properties of the diamonds by optical means, it can be arranged that the 'focus' of the trajectories of diamonds of all sizes launched by this device shall be in the viewing zone of the machine for measuring properties of the diamond.

The machine is capable of projecting objects with more accuracy than the diamonds discussed above, due to the fact that the diamonds are of irregular shape, will be rotating and can also act as aerofoils and deviate from the projection path.

A further test was made with ball bearings of one size only (2.5 mm). The ball bearings were projected within a one of angle 0.5°.

The present invention has been described above purely by way of example, and modifications can be made within the spirit of the invention.

We claim:

1. Apparatus for projecting discrete objects in spaced succession in free flight along a controlled trajectory, the objects being fed into the apparatus in spaced succession, the apparatus comprising a rotatable member having an object capture zone at a first radius $r_1$ and at least one object retaining means at a second radius $r_2$, for retaining an object fed into the object capture zone, wherein $r_1$ is less than $r_2$, and means for releasing the object from the object retaining means at a predetermined point in the motion of the rotatable member, to project the object along a predetermined trajectory.

2. The apparatus of claim 1, wherein the apparatus is for projecting objects with a controlled frequency.

3. The apparatus of claim 1, comprising means for rotating the rotatable member continuously.

4. The apparatus of claim 1, wherein the object retaining means is for retaining the object in a predetermined position with respect to the rotatable member, so that the object acquires the circular motion of the rotatable member.

5. The apparatus of claim 1, wherein the means for releasing the object is arranged so that the object is not released until it has come to rest with respect to the object retaining means.

6. The apparatus of claim 4, wherein the means for releasing the object is arranged so that the object is not released until it has come to rest with respect to the object retaining means.

7. The apparatus of claim 1, wherein the rotatable member has at least one object capture zone for capturing an object, the object capture zone being connected to the object retaining means by a channel.

8. The apparatus of claim 6, wherein the axis of the channel is inclined to the radial direction.

9. The apparatus of claim 1, wherein the ratio of $r_1$ to $r_2$ is less than 1:1 and greater than 1:6.

10. The apparatus of claim 1, wherein the rotatable member is rotatable about a horizontal axis.

11. The apparatus of claim 1, wherein the rotatable member is rotated at a substantially constant angular velocity, so that the objects are projected with a constant frequency.

12. The apparatus of claim 1, wherein the object retaining means has at least one movable first face, the first face being opened at a fixed point in the motion of the rotatable member to release the object.

13. The apparatus of claim 12, further comprising a mounting member for mounting the rotatable member and cam means mounted on the mounting member for opening the object retaining means at a fixed point in the motion of the rotatable member.

14. The apparatus of claim 13, wherein the rotatable member comprises a cam piece for interacting with the cam means.

15. The apparatus of claim 12, wherein the said first face is opened by a solenoid.

16. The apparatus of claim 1, in which the object is released in a substantially downward direction.

17. The apparatus of claim 1, further comprising means for feeding a spaced feed of discrete objects to the apparatus, whereby the objects can be fed in spaced succession with a pre-determined velocity and a pre-determined frequency.

18. The apparatus of claim 1, being for feeding gemstones.

19. A method of projecting discrete objects in spaced succession in free flight with a controlled trajectory, comprising feeding the objects in spaced succession to a rotatable member and capturing each object in the rotatable member at a first radius $r_1$, the rotatable member having an object retaining means at a second radius $r_2$ to which the object is transferred, wherein $r_1$ is less than $r_2$, and releasing the object from the object retaining means at a predetermined point in the motion of the rotatable member so that the object is projected along a predetermined trajectory.

20. The method of claim 19, wherein each object is held in a pre-determined position with respect to the rotatable member so it acquires the circular motion of the rotatable member before being released.

21. The method of claim 19, in which the object is held in the object retaining means for a sufficient time for it to come to rest in the object retaining means.

22. The method of claim 19, wherein the objects being fed are of non-uniform shape and of non-uniform mass.

23. The method of claim 19, wherein the objects being fed are gemstones.

24. The method of claim 19, wherein a rotatable member having a number of object retaining means between 1 and 10 is used, the rotatable member being rotated at between 2 and 10 revolutions per second.

25. The method of claim 19, wherein the objects are projected with a controlled frequency.

26. The method of claim 19, wherein the rotatable member is rotated continuously.

27. The apparatus of claim 17, further comprising:
a first motor for rotating the rotatable member and a second motor for driving the means for feeding a spaced feed of discrete objects to the apparatus, and
means for controlling the phase relationship of the first and second motors comprising:
  means for generating a first signal indicative of the phase of the first motor;
  means for generating a second signal indicative of the phase of a second motor;
  means for detecting the phase difference between the first and second signals; and
  a filter for filtering the phase difference;
  wherein the filtered phase difference is applied to means for controlling said first motor, thereby controlling the phase relationship of the two motors.

28. The apparatus of claim 27, wherein the first motor is a stepper motor and the second motor is a D.C. motor.

29. The apparatus of claim 27, wherein a microprocessor is used to control the speed of rotation of the stepper motor.

30. The apparatus of claim 27, further comprising:
means for generating a speed signal for the second motor;
means for computing an error signal by comparing said speed signal with a reference signal indicative of the speed of the first member;
an amplifier for amplifying said error signal;
second motor speed control means coupled to said amplifier for receiving said amplified error signal, whereby the speed of the second motor is maintained at the same speed as the first motor.

31. The apparatus of claim 30, wherein said means for generating the speed signal for the second member comprises an optical sensor.

32. The apparatus of claim 31, wherein the optical sensor comprises a slotted optical sensor.

33. A launcher for projecting discrete objects in spaced succession in free flight along a controlled trajectory, of the type wherein objects are fed into the apparatus in spaced succession, the apparatus comprising a rotatable member, the rotatable member having means defining an aperture at a first radius $r_1$ for receiving an object; and at least one receptacle at a second radius $r_2$, for retaining an object, wherein $r_1$ is less than $r_{2'}$, the receptacle having at least one moveable first face which is operable at a fixed point in the motion of the rotatable member to release the object, to thereby project the object along a predetermined trajectory.

34. The apparatus of claim 33, wherein the rotatable member comprises means defining a channel communicating at a first end with the aperture and at a second end with the receptacle.

35. The apparatus of claim 34, wherein the axis of the channel is inclined to the radial direction.

36. The apparatus of claim 33, wherein the ratio of $r_1$ to $r_2$ is less than 1:1 and greater than 1:6.

37. The apparatus of claim 33, wherein the first face is pivotally mounted with respect to the rotatable member, the apparatus further comprising a mounting on which the rotatable member is mounted and a cam mounted on the mounting member, the cam being positioned to act upon the moveable first face at the fixed point in the motion of the rotatable member.

38. The apparatus of claim 33, further comprising a solenoid for moving the moveable first face.

39. The apparatus of claim 33, wherein the aperture comprises at least one further face separate from the at least one first face, the further face being moveable and operable substantially simultaneously with the at least one moveable first face at the fixed point in the motion of the rotatable member to release the object.

40. The apparatus of claim 37, wherein the receptacle is defined by the at least one moveable first face and by two moveable closure members separate from the first face, the two moveable closure members being operable simultaneously with the at least one moveable first face.

41. Apparatus for projecting discrete objects in spaced succession in free flight along a controlled trajectory, the objects being fed into the apparatus in spaced succession, the apparatus comprising a rotatable member, the rotatable member having an object capture zone at a first radius $r_1$ for receiving an object and at least one object retaining means for retaining an object at a second radius $r_{2'}$, wherein $r_1$ is less than $r_{2'}$, and means for releasing the object from the object retaining means at a predetermined point In the motion of the rotatable member, to project the object along a predetermined trajectory, wherein the object retaining means has at least one movable first face, the first face being operable at a fixed point in the motion of the rotatable member to release the objects, wherein the object retaining means comprises at least one further face separate from the at least one moveable first face, the further face being formed by a moveable closure member which is operable substantially simultaneously with the at least one moveable first face at the fixed point in the motion of the rotatable member, to release the object.

42. Apparatus for projecting discrete objects in spaced succession in free flight along a controlled trajectory, the objects being fed into the apparatus in spaced succession, the apparatus comprising a rotatable member, the rotatable member having an object capture zone at a first radius $r_1$ for receiving an object and at least one object retaining means for retaining an object at a second radius $r_{2'}$, wherein $r_1$ is less than $r_{2'}$, and means for releasing the object from the object retaining means at a predetermined point In the motion of the rotatable member, to project the object along a predetermined trajectory, wherein the object retaining means has at least one movable first face, the first face being operable at a fixed point in the motion of the rotatable member to release the objects, wherein the object retaining means is defined by the at least one moveable first face and two moveable closure members separate from the at least one moveable first face, the two moveable closure members being operable simultaneously with the at least one moveable face.

43. The apparatus of claim 42, wherein the movable closure members have cam surfaces and the at least one movable first face has a second cam for contacting said cam surfaces, so that the closure members are operable simultaneously with the at least one movable first face.

44. The apparatus of claim 43, wherein the at least one movable first face and the movable closure members are opened so that they accelerate away from the object at an acceleration greater than the resultant of gravitational acceleration and the centrifugal acceleration due to the rotary motion of the rotatable member.

* * * * *